US006965584B2

(12) United States Patent
Agrawal et al.

(10) Patent No.: US 6,965,584 B2
(45) Date of Patent: Nov. 15, 2005

(54) DYNAMIC FORWARD ASSIGNMENT OF INTERNET PROTOCOL ADDRESSES IN WIRELESS NETWORKS

(75) Inventors: Prathima Agrawal, New Providence, NJ (US); Toshikazu Kodama, Morristown, NJ (US); Faramak Vakil, Bedminster, NJ (US); Tao Zhang, Fort Lee, NJ (US)

(73) Assignees: Telcordia Technologies, Inc., Piscataway, NJ (US); Toshiba America Research, Inc., Piscataway, NJ (US)

( * ) Notice: Subject to any disclaimer, the term of this patent is extended or adjusted under 35 U.S.C. 154(b) by 949 days.

(21) Appl. No.: 09/794,859

(22) Filed: Feb. 27, 2001

(65) Prior Publication Data

US 2002/0118656 A1    Aug. 29, 2002

(51) Int. Cl.[7] .............................. H04Q 7/00; H04Q 7/20
(52) U.S. Cl. ....................... 370/331; 370/328; 370/338; 455/436; 455/433
(58) Field of Search ................................ 370/328–338, 370/351–356, 401–402; 450/436–444; 455/436–444, 455/433

(56) References Cited

U.S. PATENT DOCUMENTS

| 6,147,986 A | * | 11/2000 | Orsic | 370/349 |
| 6,473,411 B1 | * | 10/2002 | Kumaki et al. | 370/331 |
| 6,628,632 B1 | * | 9/2003 | Dolan | 370/332 |
| 6,636,490 B1 | * | 10/2003 | Johnson | 370/328 |
| 6,647,001 B1 | * | 11/2003 | Bhagavath et al. | 370/331 |
| 6,671,735 B1 | * | 12/2003 | Bender | 709/238 |
| 6,763,007 B1 | * | 7/2004 | La Porta et al. | 370/331 |
| 2001/0044305 A1 | * | 11/2001 | Reddy et al. | 455/436 |

OTHER PUBLICATIONS

Reddy, Mobility Management in wireless IP networks, May, 22, 2000, pp. 1-12.*

* cited by examiner

*Primary Examiner*—Steven Nguyen
(74) *Attorney, Agent, or Firm*—Joseph Giordano; James W. Falk (57) ABSTRACT

A method and system for dynamic forward assignment of IP addresses in a wireless network wherein a serving base station requests IP addresses of it neighboring cells. The serving base station then provides the requested IP addresses to the mobile stations it serves based on whether the mobile station will be entering a particular neighboring cell. Immediately upon entering the neighboring cell the mobile station establishes over the air communications with the neighboring cell's base station using one of the requested addresses. In another embodiment of the present invention each mobile unit is responsible for attaining IP addresses from the base stations of neighboring cells. Accordingly, the base stations serve as relay points for the IP address requests from the mobile unit to an address server.

1 Claim, 5 Drawing Sheets

DYNAMIC FORWARD ASSIGNMENT OF INTERNET PROTOCOL ADDRESSES IN WIRELESS NETWORKS

FIELD OF THE INVENTION

This invention generally relates to provision of services in mobile wireless networks and specifically relates to assignment of Internet Protocol (IP) addresses as mobile units move between cells in a wireless network.

BACKGROUND

Merging the mobility of the cellular telephone network with the information capability and accessibility of the Internet has become a main focus of the communications industry. In particular, in recent years considerable research has been directed to developing mobile protocols that would allow seamless access to the multimedia services available on the Internet thereby allowing consumers to be online anytime and anywhere.

The Internet is a packet data network in which the Internet Protocol (IP) defines the manner in which a user is connected to the Internet so as to access, transmit, and receive information from other users or resources connected to the Internet. In particular, in accordance with IP each network access point is identified by an IP address. When a user attaches to a particular network access point the user's terminal or station is given an IP address. Access points addresses are assigned geographically. Consequently, as a user roams geographically the user's terminal point of attachment to the network changes which in turn requires the terminal's IP address to change. Further, information destined for a user, or resource, is packetized with each packet having the IP address of the user's terminal in a header. As packets traverse the network, the IP address included in the header is used to route the packet to its destination. Thus, as a user roams and her terminal's IP address changes, the route to the user changes which in turn may affect the quality of service for some multimedia services, i.e., real time services, as there is no guarantee that network resources required to support the service are available. At a fundamental level IP was not designed with mobility in mind as evidenced by the manner in which IP addresses are assigned.

In contrast, the cellular or wireless telephone network is a circuit switched network with each user's telephone number serving as a unique access identifier. Consequently, as the user roams geographically the user's identity is unchanged thereby allowing the network to easily track the user's movement, establish new circuits in anticipation of the user moving to a different geographic region, and maintain the needed quality of service. In addition, in the wireless telephone network calls between users are routed through the network on circuits that are established for the duration of the call. In other words, a path is established in the network for exclusively carrying each call thereby assuring the user of the bandwidth needed for the service.

Given the fundamentally different approaches underlying the manner in which access is provided by the Internet and by the wireless telephone network and the manner in which paths are established and signals routed through each of these networks, many issues need to be resolved before multimedia services can be provided over an IP wireless network. More precisely, these issues must be resolved before third generation wireless networks offering mobile multimedia services via an IP platform can become a reality. Of particular import to the present invention is the assignment of IP addresses to user terminals or stations as users move about geographically thereby changing their point of attachment to the network. IP address assignment is an even more vexing problem because of the limited amount of IP addresses available via the current version of IP, IP Version 4 (IPv4).

Figure 1:
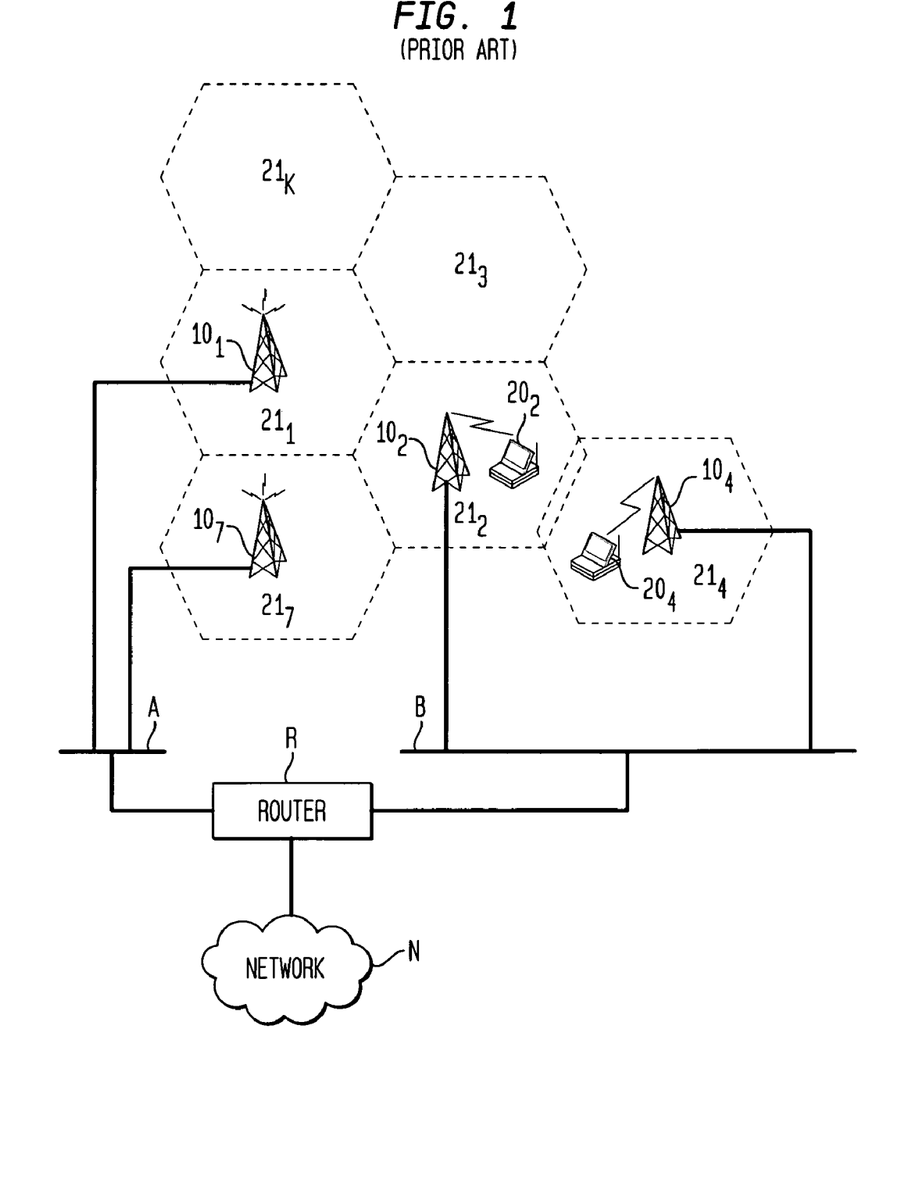
FIG. 1 illustrates a typical cellular network.

Specifically, in a wireless network such as shown in FIG. 1, a plurality of base stations 10 transmit or send information over the air to a plurality of mobile units or stations 20. The range within which a mobile unit 20 can reliably receive information from a base station 10 defines a cell 21. As illustrated in FIG. 1 the cells 21 may be depicted as a honeycomb structure. As a mobile unit $20_2$, for example, roams and moves further away from a base station $10_2$ corresponding to cell $21_2$ for base station $10_2$, signal strength decreases. Further, as the mobile moves from one cell to another, the mobile station needs to switch from its serving base station, the base station for the cell it currently is in, to a target base station, the base station for the cell that it's moving to. The process of the mobile switching base stations is known as handoff.

As discussed above, in an IP network IP addresses are assigned geographically. Consequently, in a wireless IP network as a mobile unit moves around and switches base station, the mobile unit may need to be assigned a new temporary IP address. For example, in FIG. 1 base stations $10_1$ and $10_7$ are depicted as being on the same subnetwork or subnet, subnet A. On the other hand, base stations $10_2$ and $10_4$ are on a different subnet, subnet B. Both these subnets are shown as being served by the same router R that is connected to much larger network N. If mobile station $20_2$ is handed off from base station $10_2$ to either base station $10_1$ or $10_7$ the station will change subnets. As is known in the art, whenever a terminal changes IP subnets that terminal will require a new temporary IP address while it remains attached via that subnet. In addition, when the user's terminal moves into a new IP subnet, the terminal may also need to verify the uniqueness of the assigned temporary IP address and perform IP-layer processing.

Today, approaches for an IP terminal to obtain a temporary IP address dynamically include the Point-to-Point (PPP) protocol, the Dynamic Host Configuration Protocol or DHCP, and Mobile IP. An important characteristic shared by today's approaches is that a mobile station or the target base station can start the process of obtaining new IP addresses only after the mobile station moves into the new subnet and establishes a radio connection with the target base station. Consequently, the time it takes to obtain new addresses, to verify the assigned addresses and to perform IP-layer registration becomes extra handoff delay in a wireless network. Such extra handoff delay can often become too long to be tolerable to most real-time applications such as voice and video. For example, lab experiments show that using Dynamic Registration and Configuration Protocol (DRCP) to obtain a new IP address could take over 15 seconds (dominated by the delay of using the Address Resolution Protocol or ARP to verify the uniqueness of the assigned address), which is beyond the tolerable range of end-to-end delay for most real-time applications, such as voice and video services.

IP address conservation appears to be a key reason that today's dynamic address assignment mechanisms assign address only after the unit requesting the address has established radio contact with the target base station. Prior art approaches for dynamic assignment of IP addresses need to conserve IP addresses because the current version of IP, i.e., IP Version 4 or IPv4, is running out of address space. The lack of address space in IPv4 is due to the fact that IPv4 has only a 32-bit field for an IP address. On the other hand, version 6 of IP (IPv6) will include a 128-bit IP address field.

Accordingly, under IPv6 IP addresses will be available in abundance. As such, new methods for dynamic assignment of addresses may be developed that are better suited to support the third generation wireless environment wherein mobile user terminals will often require temporary IP addresses as users roam about. Such new methods should be free of the constraint to conserve IP addresses and will be needed to support third generation wireless real-time multimedia services.

SUMMARY

It is therefore an object of the present invention to provide a method that reduces the time required for a mobile station to obtain IP addresses needed for handoff within the tolerable range of end-to-end delay required for most real-time applications, such as voice and video services.

In accordance with our invention, a mobile station obtains the addresses it needs before the mobile station enters into a neighboring cell. This reduces handoff latency and enhances the ability of a wireless network to support real-time multimedia services.

In addition, in accordance with our invention network entities on the wired network (e.g., the base stations) perform most of the work for obtaining temporary addresses and for IP-layer registration on behalf of mobile stations. This may further reduce the amount of over-the-air signaling for obtaining addresses and performing registration, which further reduces handoff latency and improves wireless resource utilization.

In accordance with an aspect of our invention, each base station (e.g., serving base station) requests IP addresses for the mobile stations it currently serves from neighboring base stations. The requested addresses are then provided to the mobile stations by each mobile station's respective serving base station while the mobile station is still under the control of the serving base station and within the serving base station's cell. Immediately upon moving into a neighboring cell the mobile station then uses one of the requested addresses to communicate with the base station of the neighboring cell (which now becomes the serving base station). In accordance with this aspect of our invention each base station maintains a list of temporary addresses for each neighboring cell in memory and dynamically assigns these addresses to mobile units. Each mobile unit will, in turn, also maintain a list of IP addresses and use the appropriate address when it enters the appropriate neighboring cell.

In accordance with another aspect of our invention the mobile unit requests its own temporary addresses from the appropriate address server, i.e., the address server responsible for a particular base station, for each neighboring base station the mobile unit communicates with. The mobile then stores the temporary addresses in memory and uses the appropriate address when it enters a neighboring cell. In this embodiment either the serving base station of the mobile or the appropriate neighboring base station then becomes a relay point in the address assignment scheme. Specifically, base stations do not request temporary addresses of other base stations and do not assign temporary addresses to mobiles. The base stations simply serve as relay point between the requesting mobile and the address server.

DETAILED DESCRIPTION

Figure 2A:
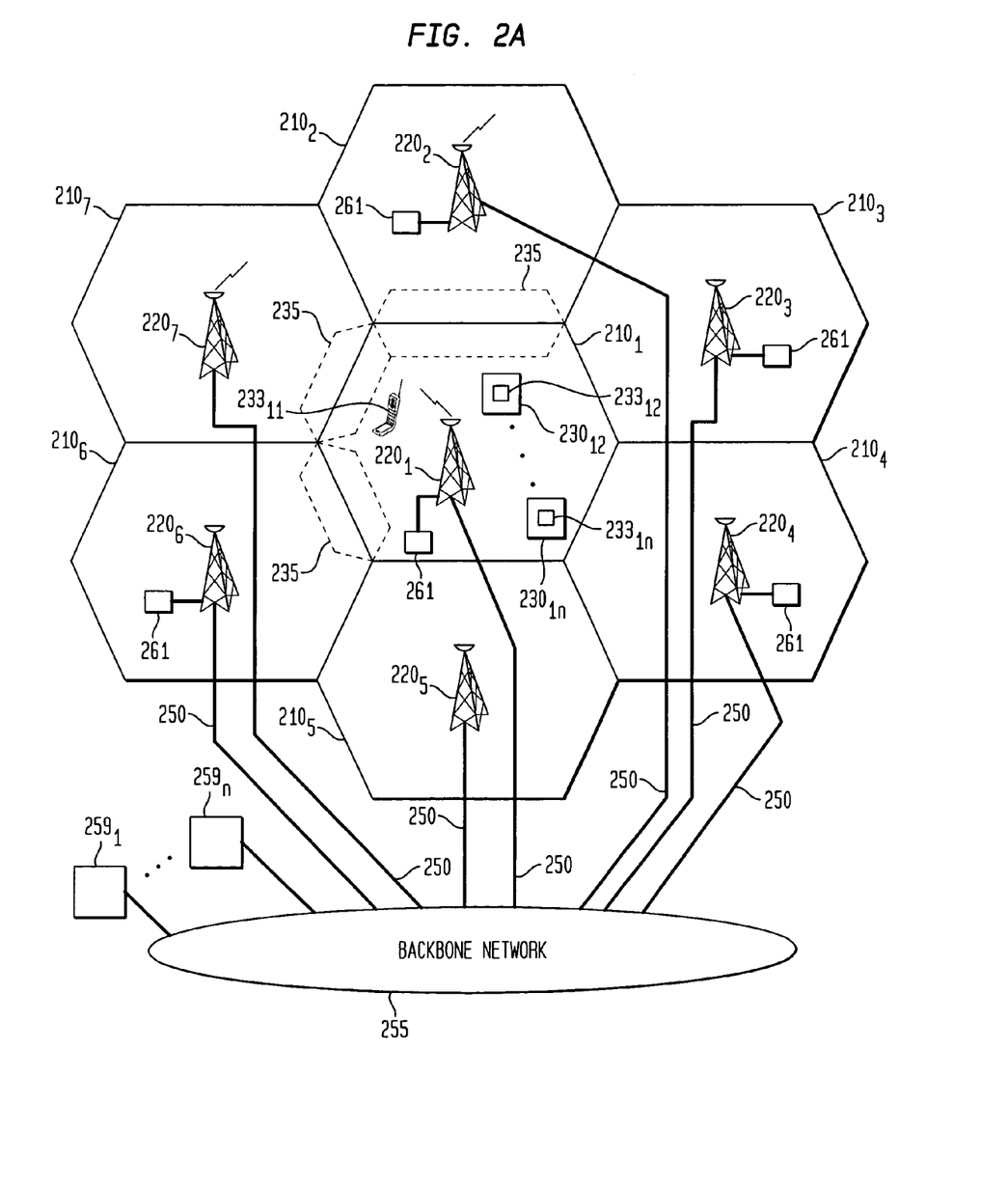
FIG. 2A depicts a serving cell and its neighboring cells in accordance with an embodiment of the present invention.

Turning to FIG. 2A there is depicted an exemplary network that is illustrative of an embodiment of our invention. In accordance with FIG. 2A, each cell 210 contains a base station 220 which communicates over the air, i.e., via a wireless network, with a plurality of mobile stations 230 that are within the cell 210 and soft handoff regions 235. The base stations 220 also communicate with each other via links 250 to a backbone network 255. In addition, a plurality of address servers 259 that are responsible for assigning IP addresses to each cell is connected to the backbone network 255.

Before discussing our invention in more detail note that we will refer to a base station that serves or controls a mobile station as a serving base station (and the cells associated with the serving base station as a serving cell). Conversely, we a refer to the neighboring base stations to which a mobile may move as target base stations (and the cells associated with such target base stations as target cells).

Each base station 220 is capable of performing IP-Layer processing such as IP packet forwarding and IP-layer signaling and mobility management. In addition, the base stations 220 function autonomously. That is, there is no centralized signaling and control over the operation or behavior of the base stations or over the provisioning of wireless network functions.

In accordance with our invention the backbone network 255 is preferably an IPv6-based network. As we explained above IPv6 includes a 128-bit IP address field which allows for up to $2^{128}-1$ unique IP addresses. Accordingly, the abundance of IPv6 addresses allows for pre-assignment or reservation of IP addresses before a mobile station enters a new cell. The mobile stations 230 and base stations 220 therefore preferably use IPv6 for transportation of user information or traffic over the wireless network. Nonetheless, it is also possible that our invention may be supported in an IPv4 environment. Such is the case because, although there is a global shortage of IP addresses under IPv4, in some local networks that efficiently manage IP addresses there may be enough IP addresses available to practice our invention. In other words, if IPv4 addresses are not wasted within a domain then our invention may be applied in such domains. As a practical example, there may be private enterprise or campus networks wherein IPv4 addresses are managed efficiently thereby freeing up enough addresses to implement our inventive method. Furthermore, there are some known prior art schemes for extending the availability of IP addresses under IPv4 including using dummy IP addresses within a domain; under this scheme, however, dummy address would be domain specific and therefore once a mobile moves outside a domain the dummy addresses would be useless.

In accordance with the embodiment of FIG. 2A each base station 220 knows the IP address of the address server 259 that is responsible for assigning IP addresses to each of its neighboring cells. As such, each base station 220 requests and reserves IP addresses from neighboring cells and assigns such addresses to the mobile stations 230 it serves. Broadly, and in accordance with this aspect of our invention, each serving base station obtains the addresses its mobile stations will need in a neighboring cell before the mobile station enters into the neighboring cell. It then stores the addresses in memory 261 and dynamically assigns the addresses to the appropriate mobile units on an as needed basis. More specifically, base station $220_1$ of cell $210_1$, for example, obtains the IP addresses its mobile stations will need from its neighboring base stations $220_2$ through $220_7$ prior to any of the plurality of the mobile stations $230_{11\text{-}1n}$ it currently serves enters a neighboring cell, $210_2$ through $210_7$. The serving base station $220_1$ then sends a list of appropriate addresses 233 to each mobile station. The mobile then maintains the list in memory 233 for future use.

Note each mobile station's list may be different depending on the probability of a mobile unit moving to a particular neighboring cell. In wireless networks where cells are large, a mobile unit probably wouldn't need to maintain temporary IP addresses for all the neighboring cells. In practice, the serving base station could wait until the mobile unit is within a certain distance from the soft handoff region between cells before assigning the mobile unit an IP address appropriate for the neighboring base station associated with each neighboring cell.

In cases where it is probable that a mobile may move into more than one neighbor, such as when a mobile is located near a corner of an hexagonal grid system, the list of appropriate addresses may be determined based on the movement of the mobile or a profile of the user. Specifically, tracking the direction of travel of a mobile unit may increase the probability of selecting the appropriate base station. The probability may also be increased by maintaining a profile of the mobile station, more precisely the mobile station's user, in a database; for example, a commuter may take the same route to work during the work week so the profile could include the expected location of the mobile station at a given time.

With respect to choosing an appropriate set of forward addresses for each mobile, note that the approaches just described above may not be necessary where addresses are available in abundance and a mobile contains the processing power or memory space to process and maintain a large list of forward addresses. Furthermore, in contrast, it may be more convenient in some circumstances to reserve addresses in all neighboring cells. This approach may be most opportune or advantageous in a pico-cellular network where the cells are small in size and a user may move to neighboring cells with equal probability.

Figure 2B:
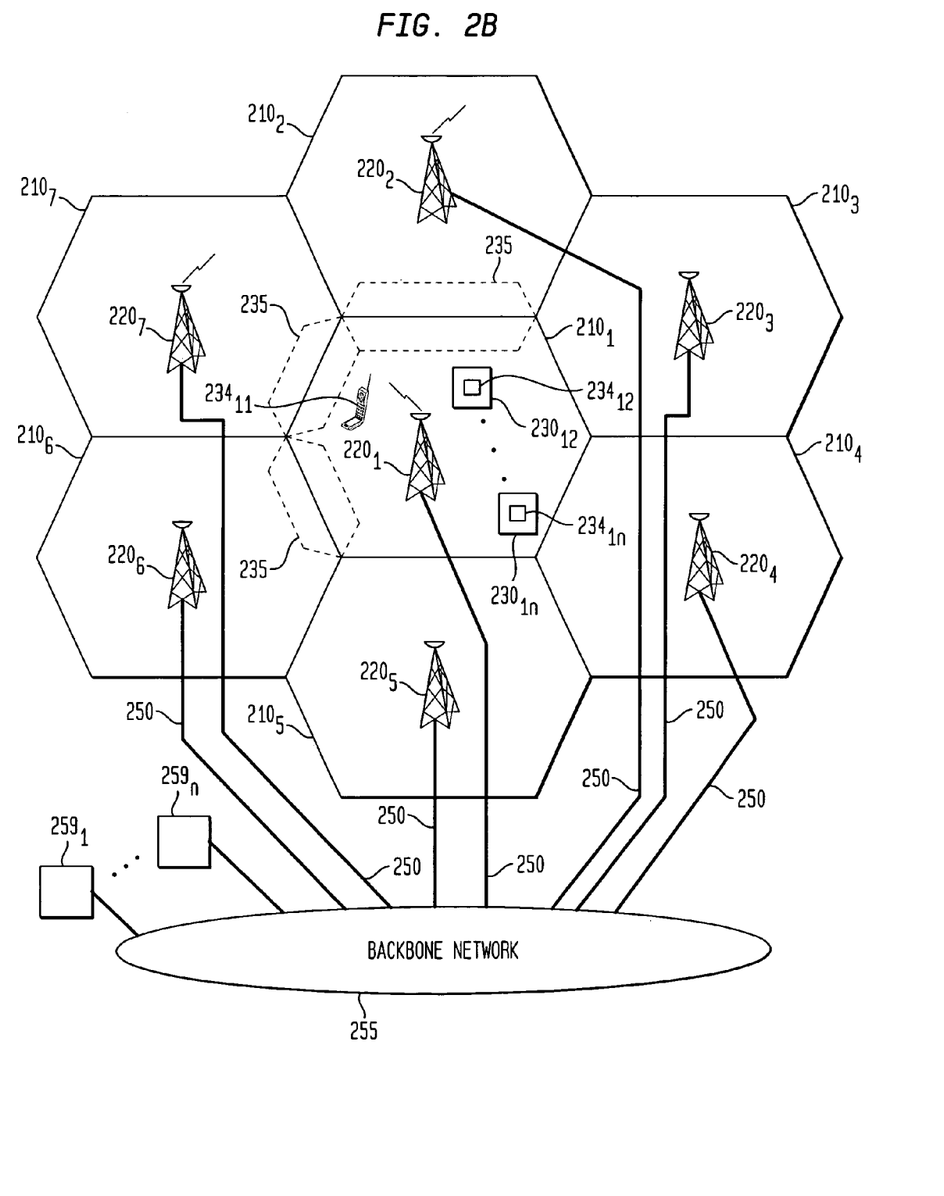
FIG. 2B depicts a serving cell and its neighboring cells in accordance with another embodiment of the present invention.

Turning now to FIG. 2B, there is depicted another embodiment of our invention. In this embodiment each mobile station knows the IP address of the address server 259 that is responsible for assigning IP addresses to each of its serving base station neighboring cells. Accordingly, the base stations 220 need not maintain temporary IP addresses for neighboring cells in memory (therefore in FIG. 2B element 261 is not needed). Each mobile station therefore requests and reserves IP addresses from neighboring cells. For the purposes of this discussion we distinguish mobile stations implemented in accordance with FIG. 2B by conveniently referring to them as intelligent mobile stations. The serving base station of intelligent mobiles then simply serves as relay points for the requested and assigned IP addresses. Implementing our invention in this way presents an additional problem in that address servers 259 are currently based on wireline networks and therefore do not recognize cell boundaries and therefore cannot know when a mobile will enter a new cell served by a different subnet or domain. We recognize this problem and suggest the following solution: when a mobile senses the presence of a neighboring base station the mobile station will relay the neighboring base station's identity through its serving base to the address server; the address server then can transmit the IP address of the neighboring base station to the mobile. In accordance with this aspect of our invention a mobile station 230 would include a memory 234 that stores forward addresses.

As those skilled in the art will recognize, the responsibility for requesting, reserving, and assigning IP addresses between mobile stations and the base stations may be shared between the base stations and mobile stations.

Figure 3A:
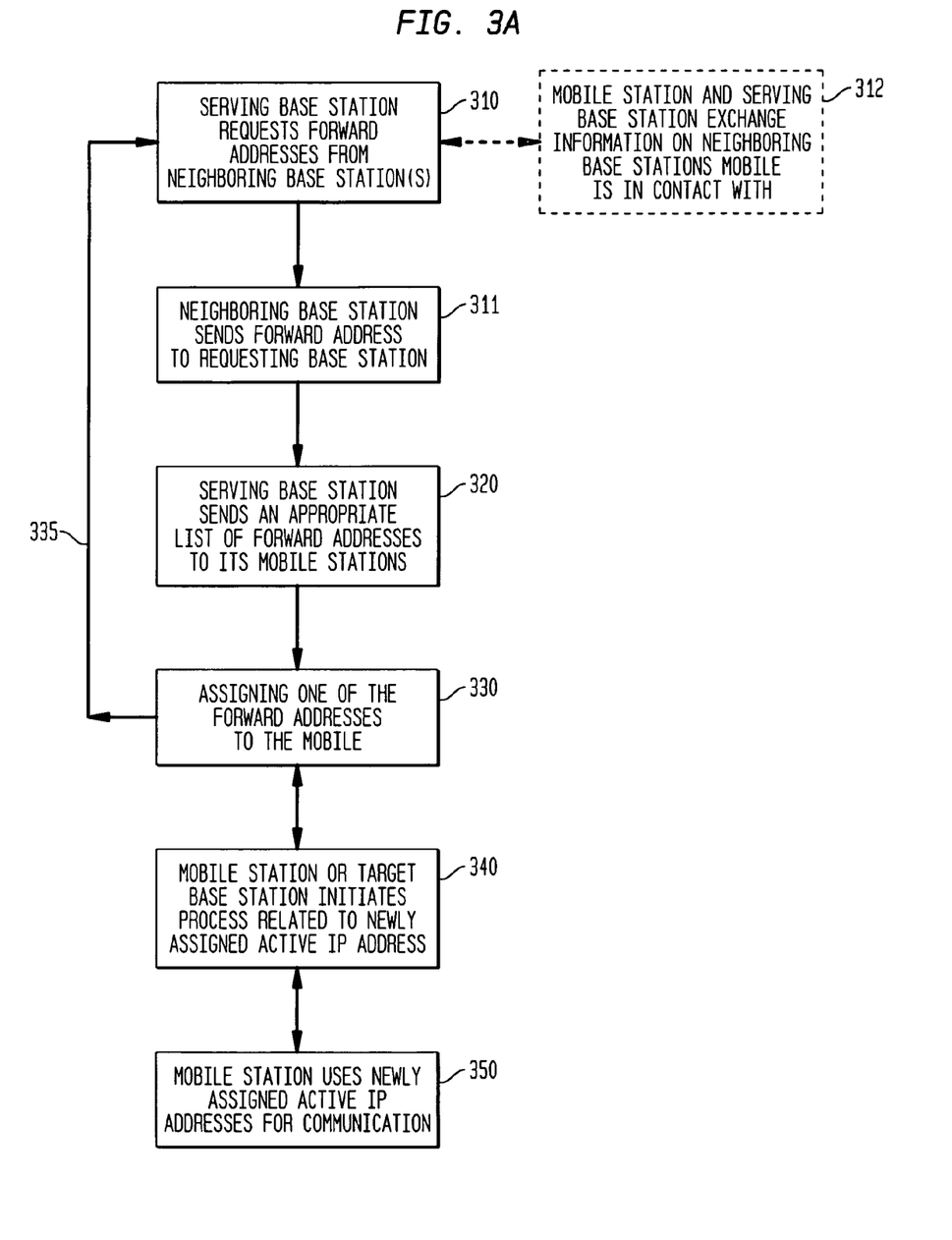
FIG. 3A depicts the method steps in accordance with the embodiment of FIG. 2A.

Turning now to FIG. 3A, there is depicted a flow chart of the method steps of our invention. As FIG. 3A shows, at step 310, a serving base station communicates with all its neighboring base stations to obtain IP addresses for each mobile station currently being served by the serving base station.

At step 311 each neighboring base station, at the request of the serving base station, provides an IP address for each mobile station currently being served by the serving base station. The request from the serving base station would seek IP addresses for only those mobiles that will need new IP addresses, i.e., mobiles that will be changing cells. We refer to the addresses obtained from the neighboring cells as forward addresses.

It is important to note that a mobile station does not need to obtain a forward address for every neighboring cell. It will get a forward address for a neighboring cell only when a different IP address is required in the neighboring cell, e.g., when the neighboring cell is on a different IP subnet.

To avoid unnecessary waste of IP addresses, the base station may request forward addresses for a mobile station only from the set of neighboring cells with which the mobile station currently has radio contact. The mobile station and the serving base station may determine such neighboring cells by exchanging information on the set of neighboring cells with which the mobile station currently has radio contact, optional step 312. As soon as a mobile station establishes radio contact with a new neighboring cell, the serving base station then requests a forward address from that new neighboring cell for the mobile station. The serving base station and the mobile station may release forward addresses obtained from a neighboring cell if the mobile station loses radio contact with that cell.

When requesting forward addresses, the serving base station will also send the necessary information about the mobile user for IP-layer authentication to the appropriate IP network entities (e.g., authentication servers) that are responsible for authentication to obtain the necessary authentication needed by the user to access services from the neighboring cell before the user moves into the neighboring cell.

The forward addresses will remain in an IN-ACTIVE state initially in the serving cell or the address requesting cell, the target cell or address-assigning cell, and in the mobile that the address is intended for. By IN-ACTIVE state we mean that the mobile station using that address is not currently inside the cell where the forward address should be used (and therefore, the forward address is not actively used).

Each forward address may also have a lifetime timer. A forward address will therefore expire automatically after its lifetime timer times out. This further improves the efficiency of our invention.

Next, at step 320 of FIG. 3A, the serving base station sends an appropriate list of the forward addresses to each mobile station currently being served by the base station for the mobile station's use when it moves out of the serving cell. Accordingly, each mobile station will maintain a list of appropriate non-expired forward addresses as depicted by memory element 233 of FIG. 2A. Memory element 233 advantageously includes a lookup table. As noted above, each mobile's forward address list may be different depending, for example, on the neighboring cells that the particular mobile has radio contact with. Thus, if the mobile is in contact with one neighboring base station the list would comprise at least one forward address from that neighboring base station. In addition, the list may be updated dynamically based on the IP addresses timing out or the mobile establishing or losing contact with a new neighboring cell. Note too that if the forward address for a neighboring cell expires before the mobile station moves out of the current or serving cell, the mobile station requests its serving base station to obtain a new forward address for that neighboring cell.

At step 330, after the serving base station detects the need to hand off a mobile station to a neighboring cell, the serving base station communicates with the target base station to activate the forward IP address the mobile station will use in the target cell, by changing the state of the forward address to ACTIVE. The serving or target base station will also inform the mobile station that the forward address to be used in the new cell is ACTIVE and can be used as soon as the mobile station moves into the cell of the target base station. When a forward address is in the ACTIVE state, the mobile can use the address to send and receive data.

At this point, the method steps may then be repeated, loop 335, as part a base station's process for dynamic address assignment.

Once an IP address is assigned to a particular mobile station, the mobile station or target station may then use the assigned IP address to initiate any additional procedures that need to be done prior to use of the newly assigned address for communications, step 340. Additional procedures or processes may need to be performed for the mobile to access IP-layer services. For example, the mobile may need to perform IP-layer registration and authentication with the IP network provider and the IP-layer service providers. The mobile station may also need to inform other users that its IP address has changed, depending on the specific IP-layer mobility management method used by the mobile station. These processes are known in the prior art. For example, if Mobile IP is used as the protocol for IP-layer mobility management, a foreign agent (e.g., the address server) for the target cell will register with the home agent of the mobile station. If, on the other hand, a SIP (Session Initiation Protocol)-based mobility management protocol is used, the address change may need to be advertised to other hosts, address servers, and the Internet Domain Name System (DNS) so that other users can use the new IP address to communicate with the mobile station.

Once the mobile station moves into the new or target cell, the mobile station immediately uses the forward address, as shown at step 350.

Figure 3B:
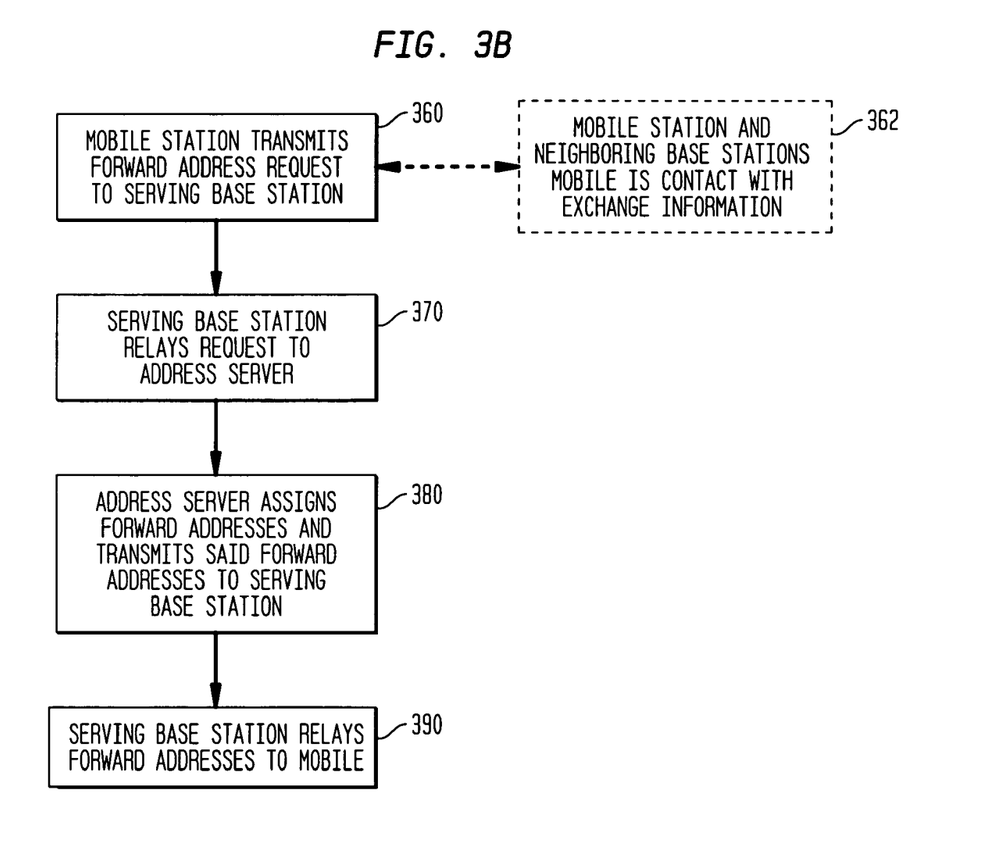
FIG. 3B depicts the method steps in accordance with the embodiment of FIG. 2B.

Turning now to FIG. 3B, there is depicted the method steps in accordance with the embodiment of FIG. 2B. At step 360 a mobile station transmits a forward address request to its current serving base station based on information received as part of an information exchange, step 362, between the mobile station and a neighboring base station. The serving base station then relays the forward address request to the appropriate address server, step 370. In terms of relaying, the serving base station, may for example, just examine the IP address of the message and send the message out on the appropriate wireline connection once it determines that the message is not intended for it. At the address server, the request is processed and the address server assigns an appropriate forward address for the requesting mobile station and transmits the assigned addresses to the serving base station, step 380. The serving base station then relays the assigned forward addresses to the mobile station, step 390. The use of a timer, registration and authentication can be done as is discussed above with respect to FIG. 3A.

The above description has been presented only to illustrate and describe the invention. It is not intended to be exhaustive or to limit the invention to any precise form disclosed. Many modifications and variations are possible in light of the above teaching. The applications described were chosen and described in order to best explain the principles of the invention and its practical application to enable others skilled in the art to best utilize the invention on various applications and with various modifications as are suited to the particular use contemplated.

We claim:

1. A method for assigning internet protocol addresses in a wireless network, said method comprising the steps of:

requesting, by a serving base station, internet protocol addresses from neighboring base stations;

sending, from each requested neighboring base station, at least one internet protocol address allocated for use by a mobile station to said serving base station;

sending, by the serving base station, a list of said requested internet protocol addresses allocated to the mobile station;

assigning one of said internet protocol addresses included in said sent list to the mobile station; and storing said list in a forward address table in said mobile station, and wherein said step of requesting comprises the steps of requesting internet protocol addresses only from the set of neighboring base stations with which the mobile station currently has radio contact and sending the necessary information about the mobile station user for IP-layer authentication to a neighboring base station.

* * * * *

UNITED STATES PATENT AND TRADEMARK OFFICE
CERTIFICATE OF CORRECTION

| | |
|---|---|
| PATENT NO. | : 6,965,584 B2 |
| APPLICATION NO. | : 09/794859 |
| DATED | : November 15, 2005 |
| INVENTOR(S) | : Agrawal et al. |

It is certified that error appears in the above-identified patent and that said Letters Patent is hereby corrected as shown below:

In The Specification

In Column 4, Line 32, delete "we a refer" and insert -- we refer --, therefor.

In Column 5, Line 33, delete "an hexagonal" and insert -- a hexagonal --, therefor.

Signed and Sealed this
Eighteenth Day of November, 2014

Michelle K. Lee
*Deputy Director of the United States Patent and Trademark Office*